Jan. 9, 1940. A. H. GAESS Re. 21,315

APPARATUS FOR FORMING METAL SLUGS

Original Filed Dec. 4, 1936 4 Sheets-Sheet 1

INVENTOR
Albert H. Gaess,
BY
ATTORNEY

APPARATUS FOR FORMING METAL SLUGS

Original Filed Dec. 4, 1936 4 Sheets-Sheet 2

INVENTOR
Albert H. Gaess,
BY
ATTORNEY

Jan. 9, 1940. A. H. GAESS Re. 21,315

APPARATUS FOR FORMING METAL SLUGS

Original Filed Dec. 4, 1936 4 Sheets-Sheet 3

INVENTOR
Albert H. Gaess,
BY
ATTORNEY

APPARATUS FOR FORMING METAL SLUGS

Original Filed Dec. 4, 1936 4 Sheets-Sheet 4

INVENTOR
Albert H. Gaess,
BY
ATTORNEY

Reissued Jan. 9, 1940

Re. 21,315

UNITED STATES PATENT OFFICE 21,315

APPARATUS FOR FORMING METAL SLUGS

Albert H. Gaess, Waterbury, Conn.

Original No. 2,138,488, dated November 29, 1938, Serial No. 114,144, December 4, 1936. Application for reissue April 20, 1939, Serial No. 268,951

41 Claims. (Cl. 29—34)

This invention relates to the cold working of metal, such as is performed in a heading machine wherein metal slugs are cut off from rod or wire stock and carried to a forming die for subjection to a heading operation.

A main object of the invention is to provide an improved method and mechanism for producing slugs, one after another, at a cutting-off station, preparatory to transporting these slugs, one after another, to a heading station, with the cutting-off operation performed in such way that each slug is produced by a transverse shearing operation the line of cut of which is across an end-length of the stock projected beyond the face of the cutting-off station and yet the slug thus cut off is so shaped at its ends that a proper heading operation can be performed thereon at the heading station.

Another object is to provide such an improved mechanism, and one which will operate perfectly in a high-speed power-operated heading machine.

Another object is to provide an improved mechanism as above, and one such that vibration of the heading machine in a direction transverse to the line of travel of the head will be reduced to a minimum.

Another object is to provide an improved method and mechanism as aforesaid, wherein slugs of exceedingly small lengths can be satisfactorily handled.

The invention primarily concerns itself with the solution of the problem of obtaining slugs with clean and true cut-off ends, that is, ends which are absolutely perpendicular to the axis of the slug, and to do so at high speed. With the ordinary cutter, there is a tendency for the end-length of the stock, which projects beyond the face of the cutting-off station across which the cutter works, and which is to be sheared off to produce the slug, to tilt, in response to the impact of the shearing edge of the cutter. The result is that slugs are produced with slanted ends. In the case of such a slug, that is, one not having perpendicular ends, the heading operation fails to produce a perfect head, especially when making a head which is intended to be half-round or spherical. If the ends of the slugs are slanted, the slug metal flows within the heading die other than as intended, so that the head of the slug when finally formed has a greater bulk of metal to one side of the axis of the slug than to the other side thereof. Where the slugs are of very small diameter, or very small length, or both, these difficulties seem to be aggravated.

Previous attempts to produce cut-off slugs with perpendicular ends, by a cutter acting to transversely shear metal wire stock by a line of cut which is across an end-length of the stock projected beyond the face of the cutting-off station, have failed of the intended purpose. For instance, it has been attempted to attain a perpendicular or square cut-off by providing a spring-urged backing element opposite the power-cutter, but this has proved impractical, for the reason that the backing element tends to vibrate at the natural period of vibration of the spring, and when the machine is operated at a speed such that its vibration is in harmony with the natural period of vibration of the spring, the backing element fails to function or does so erratically. Other expedients have been tried, but none of these have served to insure the production at practical speeds of slugs with truly square ends.

A feature of the present invention is the provision of a cutting instrumentality, hereinafter called the cutter-block, and operated in the same manner as the ordinary cutter in so far as reciprocation across the face of the cutting station is concerned, but one so constructed that each slug cut off thereby will have truly square ends.

Another feature of the invention, which takes advantage of the fact that the new cutter-block acts ideally when operated to perform a short, sharp blow in cutting direction, is the provision of a carrier, other than the cutter, for receiving from the cutter-block a cut-off slug in the latter, and then for moving beyond the cutter-block to transport such slug to the forming die.

By providing a carrier operated with a cutter-block as above, and by properly controlling the reciprocations of these parts, there is fully solved the problem of getting a slug, contained in the cutter-block as the result of a previous working stroke of the cutter-block, out of the cutter-block and into the carrier.

Another feature of the invention, which also takes advantage of the fact that as it cuts off a slug the new cutter-block may positively and unyieldingly seize and confine therein the entirety of the length of the slug to be produced, is that very small slugs can be produced also always to have truly square ends.

According to this feature of the invention, the quill of the cutter-block is employed as a magazine for a plurality of slugs each cut off from the stock during one working stroke of the cutter-block. The cutter-block quill becomes such magazine merely by making the length thereof a multiple of the length of the slug. The length of the cutter-block quill can be any desired multiple of the length of the slug, as to provide a magazine for three slugs, or four, or any desired number thereof; and in this way, very small slugs can be made, and made with perpendicular ends, and properly handled all the while they are in the machine.

Other objects and advantages will appear hereinafter.

The invention will be more clearly understood from the following description, when taken in connection with the accompanying drawings, showing one form of the new mechanism incorporated in a single blow header, and which mechanism constitutes a structural embodiment of the invention and one facilitative of a carrying out of the method of the invention in the way now preferred. While the invention will be described in connection with a single blow heading machine, it can be employed as well in connection with a multiple blow heading machine; and it is to be understood, generally, that all matter shown in the drawings, and all matter herein contained except in the appended claims, is merely illustrative and not to be taken in a limiting sense. These claims define the scope of protection contemplated; and they are, of course, to be given full range of equivalents.

In said drawings:

Figs. 16 and 17 show the operating parts for the cutter-block and carrier as these parts would be seen when looking toward the right in either Fig. 1 or 2, except that while Fig. 17 is entirely a view in side elevation, Fig. 16 is partially in section.

Figures 1, 14, 15:
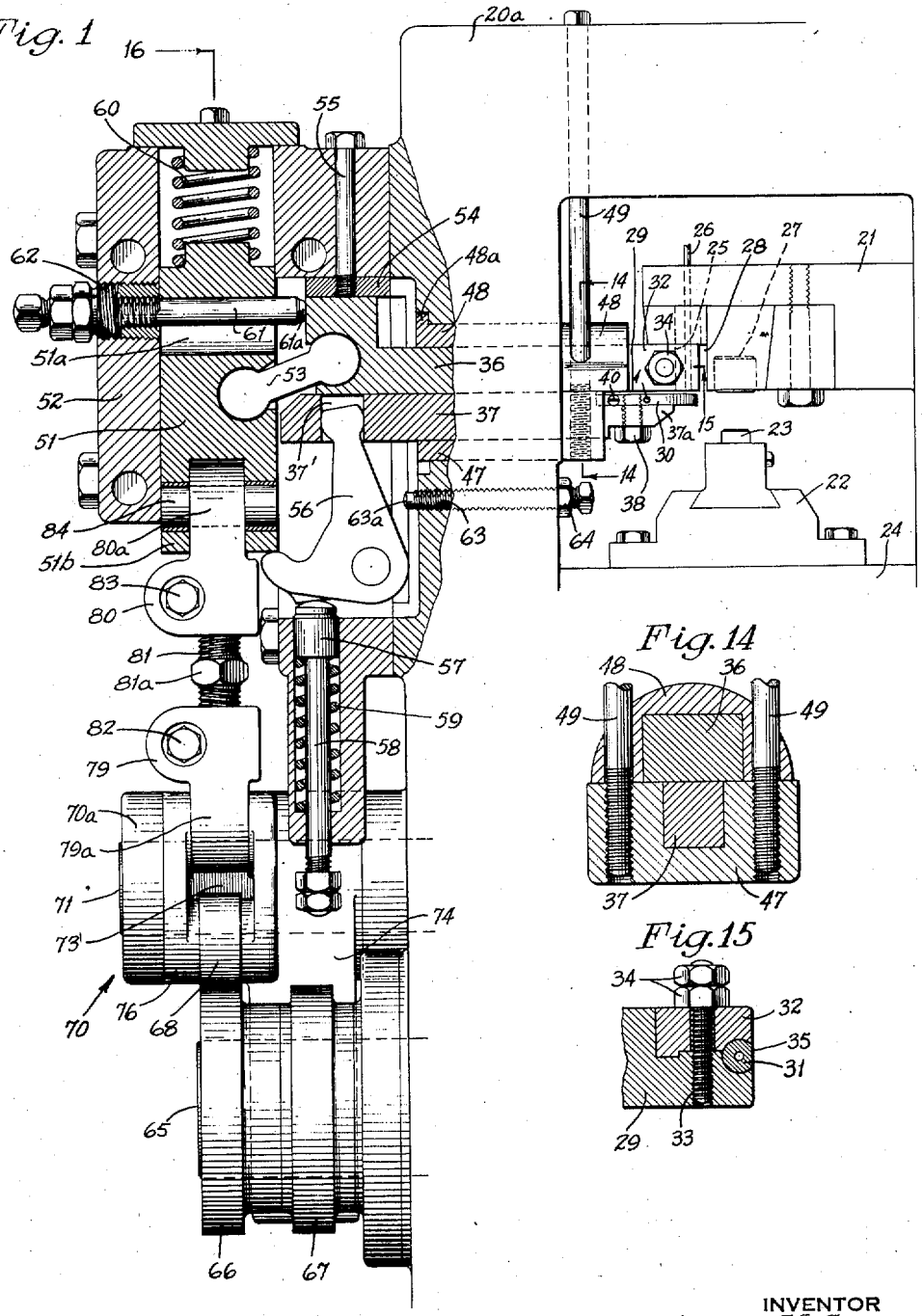
Figure 1 is a view partially in top plan and partially in section, showing a single blow heading machine of conventional type, and incorporating a now preferred mechanism according to the invention,—the cutter-block 29 and carrier 30 being shown at the ends of their return strokes.
Fig. 14 is an enlarged detail view in vertical section.
Fig. 15 is a similar view, taken on the line 15 of Fig. 1.
Figure 2:
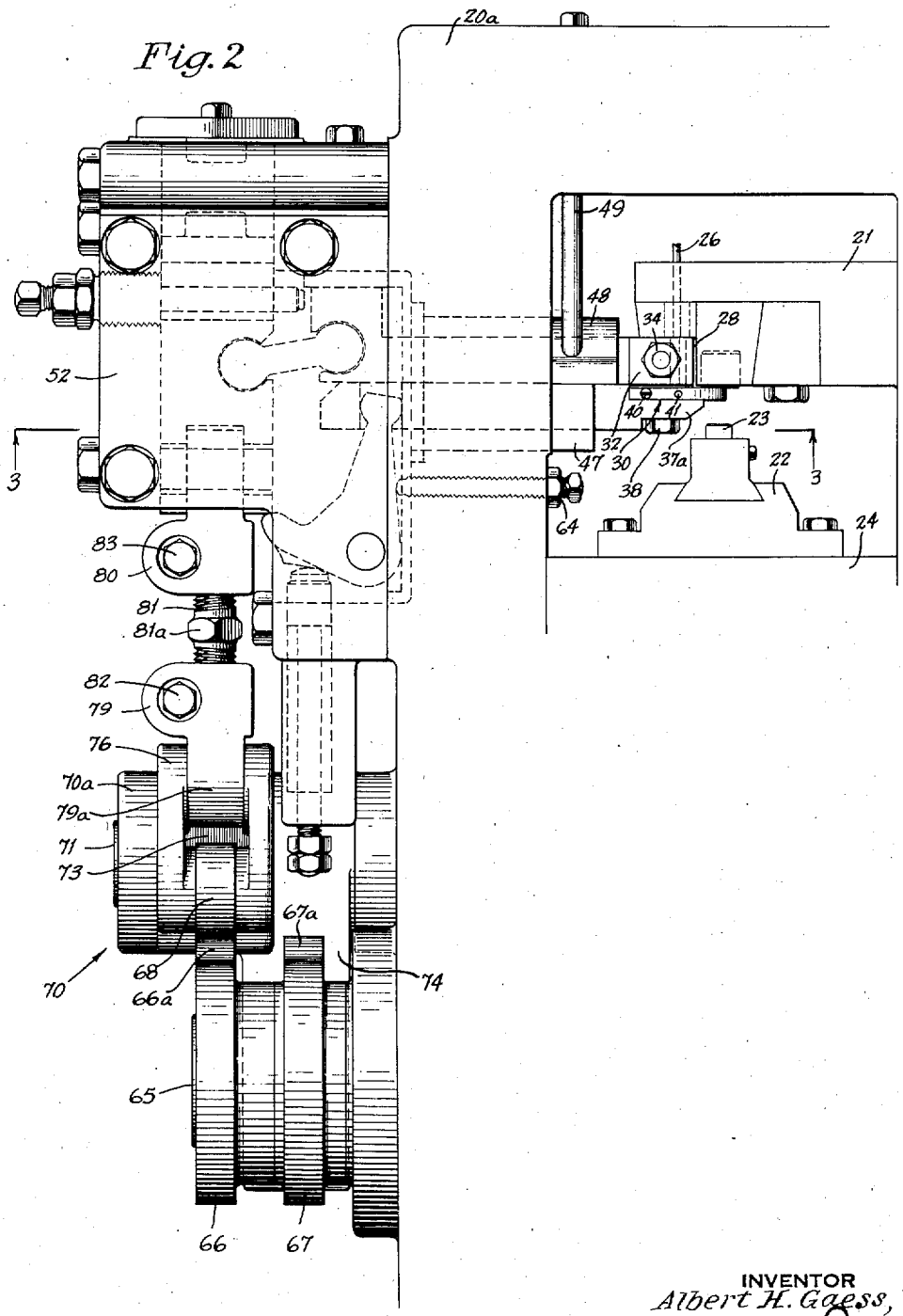
Fig. 2 is a view similar to Fig. 1, but showing the cutter-block and carrier at the ends of their working strokes,—Fig. 2 being entirely in top plan.
Figure 3:
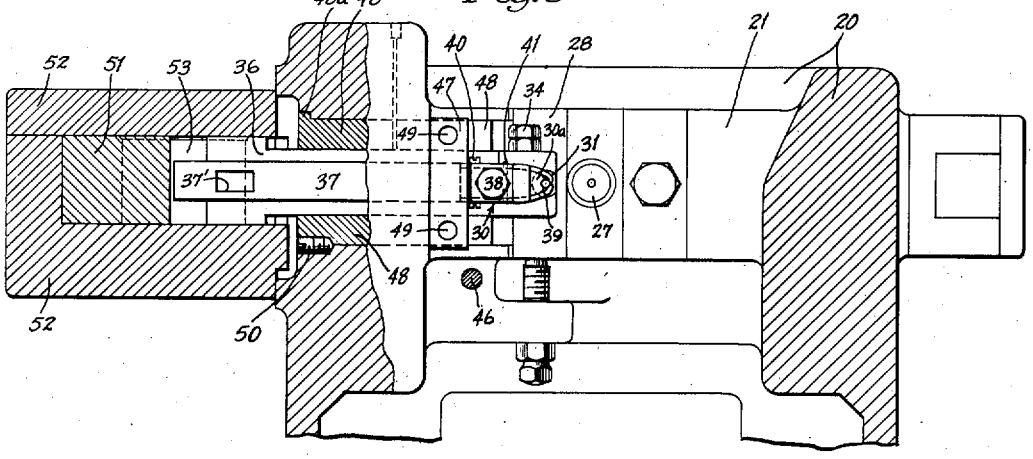
Fig. 3 is a transverse vertical section, taken substantially on the line 3—3 of Fig. 2, and on a somewhat enlarged scale, looking toward that end of the machine where is located the fixed bed for carrying the fixed stock-supply quill and the forming die and between which two last-mentioned elements the carrier of the present invention is reciprocated.
Figure 4:
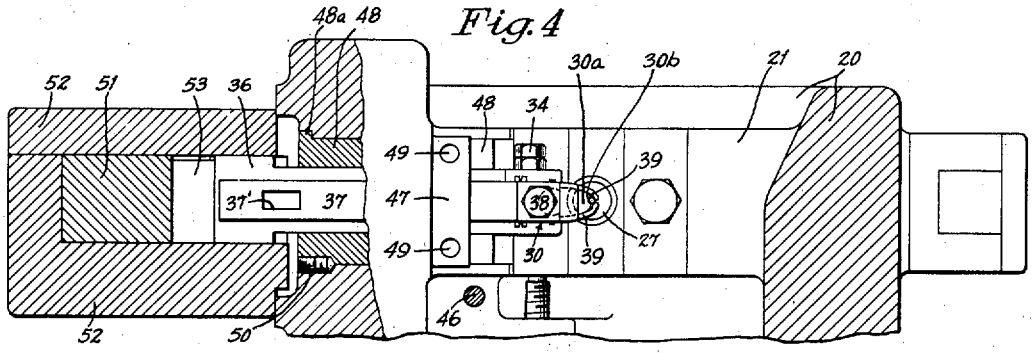
Fig. 4 is a view similar to Fig. 3, except that in Fig. 4 the cutter-block and the carrier are shown at the ends of their working strokes, while in Fig. 3 they are shown at the ends of their return strokes.
Figure 16:
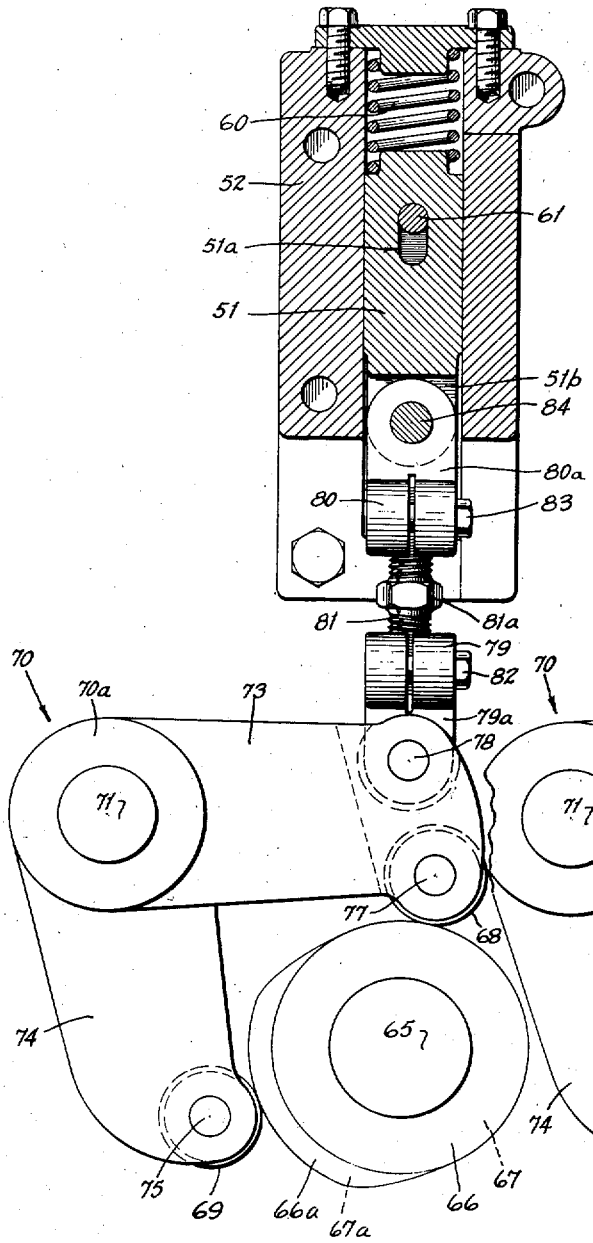
Figure 17:
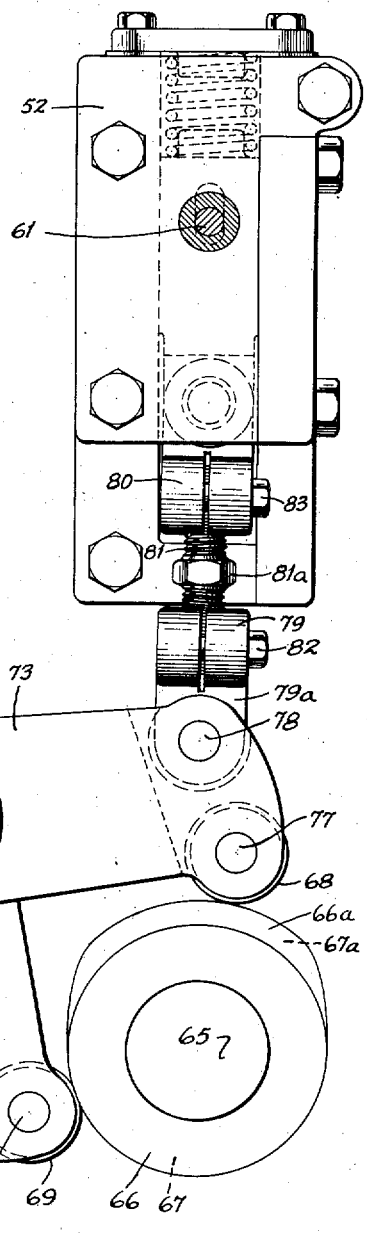

Also, in Fig. 16, the operating parts for the cutter-block and carrier are in the dispositions they would have when the cutter-block and carrier are at the ends of their return strokes, as in Figs. 1 and 3; while in Fig. 17 said operating parts are in the dispositions they would have when the cutter-block and carrier are at the ends of their working strokes, as in Figs. 2 and 4.

As shown best in Figs. 1 to 4, the conventional single blow heading machine illustrated includes the usual main frame 20 suitably mounting a fixed bed 21. As such machine is illustrated, it also includes, opposite the bed 21, the usual movable head 22, such head for mounting a heading tool 23, and secured to a power-operated gate 24 travelling in horizontal guides (not shown) carried by the main frame 20.

At spaced points across the end of the bed 21 which faces the head 22 are the fixed stock-supply quill 25 for the metal rod or wire stock 26, and a forming die 27. This die 27, which can be either of the split or solid type, is opposite the heading tool 23.

The outer end of the fixed stock-supply quill 25, hereinafter called the fixed quill, locates the cutting-off station, while the outer end of the forming die 27 locates the heading station.

As will be seen from Figs. 1 to 4, and also from Figs. 5 to 13, the cutter-block, indicated at 29, is here shown as having a working stroke only about equal to the diameter of the stock 26, while the carrier, indicated at 30, has a working stroke measured by the full distance across the bed 21 between the fixed quill 25 and the forming die 27.

The carrier 30 may be, as shown, of lighter weight than the cutter-block 29, and, also, the slide which mounts the carrier for its reciprocation may be lighter than the slide which mounts the cutter-block for its reciprocation; such slides, hereinafter described in detail, being shown in transverse section in Fig. 14. These parts are operated in properly timed relation, so that, incidental to movements of the carrier 30 back and forth all the way between the cutting-off station, at the fixed quill 25, and the heading station, at the forming die 27, the cutter-block 29 is given much smaller reciprocations.

One result of this arrangement is to reduce to the minimum vibration of the heading machine in a direction transverse to the direction of travel of the head 22. In this connection, it should also be noted that, although the carrier 30 has a greater extent of reciprocation than the cutter-block 29, the initiation of each working stroke of the carrier 30 differs from the start of each such stroke of the cutter-block 29 in that it is the latter only which commences its working stroke coincidental with the shock resulting from the shearing off of a slug. That is, the comparatively extended reciprocation of the carrier sets up no or negligible vibration. At the same time, the extent of reciprocation of the cutter-block may be so slight, and the rate of reciprocation thereof may be so fast, that each return stroke of the cutter-block, in view of the weight thereof, acts to throttle the vibration tended to be set up by the shock last-mentioned while the latter is only incipent. When the cutter-block is reciprocated at an exceedingly high rate of speed, as is desirable from the production standpoint, the extent of such reciprocation, it has been found, need not exceed the diameter of the stock and can even be a fraction of such diameter.

A feature of the invention is the provision of a cutter-block including a cut-off quill which is preferably at least as long as the slug to be produced, thereby to girthwisely confine the end length of the stock, to be cut off to make that slug, from end to end thereof. When the cutter-block quill receives and confines the entirety of this end length of the stock, or a part of the length thereof which is considerable as compared with the total length thereof, a slug having a truly square end is produced at each shearing stroke of the cutter-block.

In order that the cutter-block quill, hereinafter called the cut-off quill, can have considerable thickness in the direction of advancement of the stock 26, the cutting-off station is stepped considerably back from that part of the face of bed 21 which is to be traversed by the carrier 30 in transporting a cut-off slug gripped by the carrier to proper heading position opposite the forming die 27. Such step-back is here provided by recessing the bed 21 as indicated at 28 in Figs. 1 and 3; and from the latter of these views it will be seen that this recess conveniently extends from top to bottom of the head.

The cutter-block 29 as shown is of a thickness in the direction of stock advance to completely fill the horizontal depth of the recess 28. This relationship of the parts is illustrated very clearly in Fig. 5, from which view it will be seen also that the carrier 30 is shown as having a line of operation parallel with and very close not only to the adjacent side of the cutter-block, but also to the outer end of the forming die 27.

Figure 5:
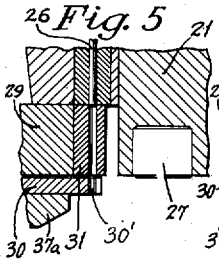
Fig. 5 is one of a series of fragmentary views respectively illustrative of successively set up relations between the stock and the differentially reciprocating cutter-block and carrier; this view being a horizontal section, on a scale enlarged over that of Figs. 3 and 4, taken through the bed of the machine axially of the stock-supply quill and the cutter-block quill.

The cut-off quill 31 of the cutter-block 29 is, as particularly clearly seen from a comparison of Figs. 5 and 15, a true quill inserted in the cutter-block. Such an inserted cut-off quill is preferred, rather than a cut-off quill integral with the cutter-block (as a cut-off quill constituted merely by a bore through the cutter-block material), so that when the heading machine is to be set up for handling stock of a different diameter than that of the stock 26, the adaptation of the cutter-block to the change can most conveniently be had by merely substituting in the cutter-block 29 a new cut-off quill for the one previously therein.

As illustrated best in Figs. 1 and 15, the cut-off quill 31 is rigidly but removably carried by the cutter-block 29, by securement of the quill under a locking plate 32 which partially builds up the forward end of the cutter-block. This locking plate is clamped down tight on the cut-off quill by draft means including a threaded stud 33, going through the plate 32 and screwed into the cutter-block, and nuts 34 applied to the end of the stud protruded beyond the outer face of the clamping plate. The underside face of this plate is cylindrically recessed, there being a matching recess in the cutter-block; and for being securely gripped by the rotund seat thus provided the cut-off quill has a cylindrical exterior. Thus a cut-off quill of the same cylindricity of exterior, but with a larger or a smaller bore than that shown in the cut-off quill 31, can be readily substituted, and at a part of the machine always accessible, to correspond with the new fixed or stock-supply quill substituted for the quill 25 in the head of the machine, when slugs are to be cut off from stock of a different diameter than that of the stock 26. As illustrated in the present case, the cut-off quill 31 desirably has its cylindrical exterior interrupted by a plane wall 35, so that the working end of the cutter-block can be flush all over, and so that the recess 28 in the head 21 can be of minimum dimension across the head 21.

Figure 7:
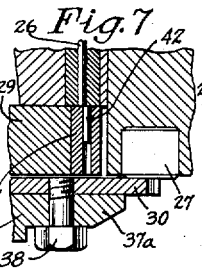
Fig. 7 is a view similar to Fig. 5, but showing the cutter-block and carrier each at the end of its first working stroke.

As seen most clearly from a comparison of Figs. 1 and 7, the reciprocation of the cutter-block 29, as aforesaid a very short one, is such that at the end of a working or cut-off stroke, the flush end of the cutter-block is somewhat spaced from the wall of the recess 28 facing this end. In other words, the stock 26 is not representative of the largest diametered stock which the machine illustrated can handle. By virtue of the spacing last referred to, a substitute cut-off quill could be set in the cutter-block 29 for taking stock of such large diameter that, in order to obtain at the same time adequate wall strength for this substitute quill at the side thereof which corresponds to the side of the quill 31 carrying the plane wall 35, the substitute quill might not have its cylindrical exterior interrupted by such a wall, and yet the same cutter-block and clamping plate 32 could be employed to secure this substitute quill properly in the cutter-block without interfering with the reciprocation of the latter in the recess 28.

In view of the provisions above described, the cutter-block is conveniently made integral with an operating slide for the same; such slide being marked 36 in Figs. 1, 3 and 14.

Another slide 37, see also Figs. 1, 3 and 14, is provided for operating the carrier 30; but this slide 37 is here shown, in order to allow one carrier to be readily substituted for another to adapt the same for handling slugs of different diameters, as a part different from the carrier 30, and means are provided for allowing any one of various carriers like the carrier 30 to be readily mounted on and demounted from the forward end of the slide 37.

Figure 12:
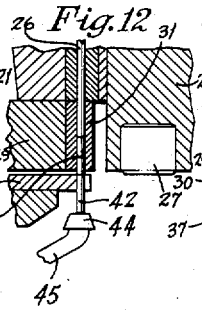
Fig. 12 shows said parts as in Fig. 11, but after the completion of the third stock advance.

Referring in this connection to Figs. 1 to 4, the forward end of the slide 37 is undercut behind a tapered front portion or nose 37*a* to provide a recess in which the carrier 30, when placed therein, will be securely locked on tightening a screw 38. As will be noted, the carrier 30, at its forward end which projects beyond the nose 37*a* of slide 37, is provided with an anvil, marked 30*a* in Fig. 4. This anvil has convergingly curved top and bottom edges, and near what would be the meeting point of these edges the anvil carries a substantially semi-cylindrical transverse groove, marked 30*b* in Fig. 4. This groove 30*b*, which has a line of extension parallel to the direction of feed of stock 26 through quill 25, and also parallel to the axis of cut-off quill 31, combines with the front incurled ends of a pair of leaf springs 39, to establish a dependable seizing device or gripper for a slug transferred from the cutter-block 29 to the carrier 30; whereby after such transfer the slug is held by the carrier as shown in Fig. 12. The leaf springs or clips 39 are resiliently biased so as along their main lengths adjacent to their incurled ends to lie against the convergingly curved top and bottom edges of anvil 30*a*, as shown perhaps best in Fig. 4; these clips being secured to the carrier by screws and pins marked 40 and 41 respectively in Fig. 3.

A carrier 30 such as just described is now preferred, but it will be understood that the invention is not to be limited to any particular kind of design of carrier. The type of carrier illustrated is now recommended, because it has in long continued use been found to be entirely satisfactory in transporting a slug from one position to another in a heading machine.

One such carrier 30 can be substituted for another when stock so different in diameter from the stock 26 is being handled by the machine that the carrier then in place in the machine will not function satisfactorily, because the gripper is not of the right size and because its location on the carrier is not such that it will be properly aligned with the axis of the stock when the slide 37 is at the end of its working stroke.

As stated, the cutter-block 29 and the carrier 30 move at different speeds and to different extents, the former moving just enough, as shown in Fig. 7, to sever the slug from the stock, and the latter moving far enough to bring the slug in front of the forming die 27. Usually, the slugs are much shorter than the cut-off quill 31, and therefore it is practicable to have a length for this quill which is a multiple of the slug length for this quill. In the present case, by way of most simple illustrated example, the length of the quill 31 is shown as being twice the length of the slug; so that the cutter-block 30 provides a two-slug magazine. The quill 31 may have a length which is any desired multiple of the length of the slug, as to provide a magazine for three slugs, or four, or any desired number thereof; and in this way, very small slugs may be made, and with perpendicular ends, and properly handled all the while they are in the machine.

When a heading machine is thus provided with a magazine cut-off, it is adapted to produce slugs of very small length, and in accordance with the invention, that is, with absolutely square ends. Just before the start of each pair of working strokes of the cutter-block and carrier, which are simultaneously performed although at different speeds, the cut-off quill 31 and the gripper of the carrier are at rest in alignment with the stock-supply quill 25; and it is at this point that the stock 26 is endwisely advanced a slug length through the quill 25,—and in a suitable way, such, for instance, as by the use of stock-feeding wheels (not shown) well known in the art of heading machines, and the operation of which is commonly synchronized with the reciprocation of the usual cutter, so that the stock will be given the required advance during the momentary pause of the cutter at the end of its return stroke with its cutting edge in position to act shearingly of the advanced stock on the next forward movement of the cutter. In the same or any suitable way, an endwise advance of the stock 26 to the prevised extent is caused to occur each time the parts are arranged as shown in Fig. 5.

Since in Fig. 5 the stock 26 is not shown as yet at all advanced into the cut-off quill 31, this view is representative of the start of a run of the heading machine.

Figure 6:
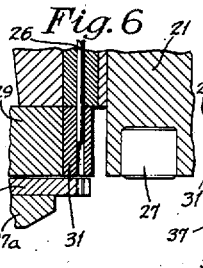
Fig. 6 is a view similar to Fig. 5, showing the completion of an initial stock advance.

Referring to Fig. 6, the first endwise advance of the stock 26 is shown as having been completed, in the present case to prepare for the production of a slug which is just half as long as the cut-off quill 31; with the cutter-block 29 and the carrier 30 both at rest each at the end of its return stroke.

Figure 13:
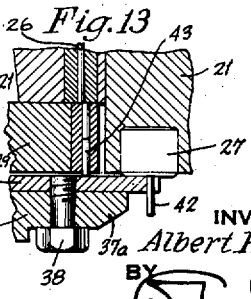
Fig. 13 shows the cutter-block and the carrier each at the end of its third working stroke, with the carrier now having completed transport of the initially cut-off slug to heading position.

With these parts halted in Figs. 5 and 6, the bore of the cut-off quill is aligned with the bore of the fixed quill 25, so that the cutter-block, in effect, is in the same position as that last above described for the cutting edge of the ordinary cutter. At the same time, the carrier is so disposed that the opening of its gripper, such opening marked 30' in Figs. 5 and 13, is likewise aligned with the stock 26.

Referring next to Fig. 7, this shows the cutter-block 29 and the carrier 30 at the end of the first working stroke of each. The first slug 42 has now been cut off with absolutely square ends.

Attention is again directed to the very short stroke of the cutter-block 29; this stroke performed each time the carrier 30 travels all the way to align the gripper opening 30' with the forming die 27. The stroke of the cutter-block, it has been found, need be only about one-third of the diameter of the stock 26, because the stock will crack through the rest of the way, in order to produce a truly square end for the slug, if the blow is sharp enough and the grain of the metal coarse enough. The statement last made is believed to be correct in all instances, but, as will be understood, such statement is made not by way of limitation but merely to explain the invention as fully and clearly as possible so far as the same has been demonstrated in practice.

It will be noted from Fig. 7 that during the first working stroke of the cutter-block 29, the slug-magazine thereof (the bore of the cut-off quill 31) is only half filled; while the simultaneously performed first working stroke of the carrier is idle.

Figure 8:
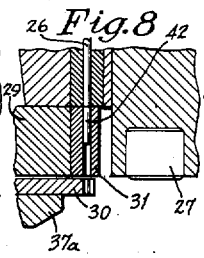
Fig. 8 shows said parts each at the end of its first return stroke.

Referring next to Fig. 8, this shows the cutter-block and carrier again returned to align the cut-off quill and the gripper opening with the stock, as in Fig. 5; the dispositions of the parts shown in Fig. 8 marking the end of the first return stroke of the cutter-block and of the carrier. The stock 26 is now ready for a second endwise advance.

Figure 9:
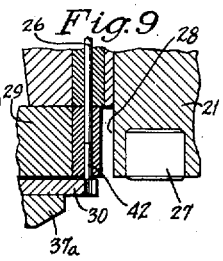
Fig. 9 shows said parts as in Fig. 8 but after the completion of a second stock advance.

Fig. 9 shows said advance of the stock completed. An end-length of the stock corresponding to the slug next to be produced is now inserted into and half way through the magazine of the cutter-block. The slug 42 is now displaced to the location shown in Fig. 9, that is, whereas the inner end of this slug was previously at the inner end of the cut-off quill as in Figs. 7 and 8, the outer end of said slug is now at the outer end of the cut-off quill. As soon as the cutter-block performs its second working stroke, the cutter-block magazine will be filled.

Figure 10:
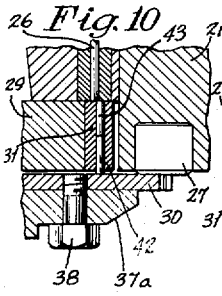
Fig. 10 shows the cutter-block and carrier each at the end of its second working stroke.

Referring to Fig. 10, this condition is illustrated. The cutter-block 29 and the carrier 30 are again shown as having completed a working stroke. This stroke of the cutter-block, its second working stroke, has produced a second slug 43 for completing the filling of the two-slug cutter-block magazine illustrated. The carrier 30 has also completed its second working stroke, another idle one, but the last such to be performed.

Figure 11:
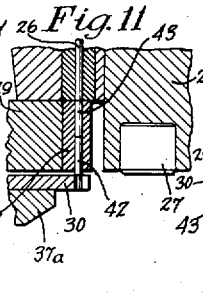
Fig. 11 shows said parts each at the end of its second return stroke.

In Fig. 11, the cutter-block and carrier are again shown fully retracted, each to the end of its return stroke. The stock 26 is now ready for a third endwise advance.

Fig. 12 shows this stock advance completed, another end-length of the stock 26 corresponding to the slug next to be produced now being inserted into and again half way through the magazine of the cutter-block. The second-made slug 43 is now at the outer end of the magazine, and the first-made slug 42 is extended clear of the outer end of the magazine and entered into the gripper of the carrier 30.

Referring finally, in this description of an illustrative and now preferred way of carrying out the method of the invention, in terms of the facilitative apparatus shown, to Fig. 13, this view shows the cutter-block 29 and the carrier 30 each at the end of its third working stroke. From now each working stroke of the carrier will be a slug-transporting one, from the magazine of the cutter-block to the heading station at the forming die 27.

At 44 in Fig. 12 is indicated a stop against which the outer end of the slug 42 abuts when the latter becomes disposed as shown in this view. Such abutment prevents accidental loss of a slug incidental to its transfer from the magazine of the cutter-block to the gripper of the carrier. This stop is on an arm 45, as partially illustrated in Fig. 12; such arm adapted to be secured in the required adjustment along a fixed rod marked 46 in Fig. 3, to provide a setting for the stop 44 in correspondence with the length of the slug being produced.

There will now be described the mountings for the slides 36 and 37 with which are reciprocated the cutter-block and the carrier as just above described, and the operating means for thus reciprocating said slides.

Referring to Figs. 1, 3, 4 and 14, the two slides 36 and 37 are in relatively slidable mutual engagement at meeting faces along their lengths, and are housed in longitudinal guiding channels in the two parts of a longitudinally split sleeve-mount fixedly extending through a side of the machine opposite the bed 21. One of these sleeve parts is a member 47 carrying the channel for the slide 37 which operates the carrier 30, and the other is a member 48 carrying the channel for the slide 36 which operates the cutter-block 29. The relative cross-sections of these slides, and correspondingly those of said channels, are shown best in Fig. 14. The members 47 and 48 are locked together, and in an accommodating recess in a side framing 20*a* of the machine, by means of bolts 49 engaging tapped holes in both said members and at their threaded ends extending through an end portion of the frame 20 of the machine (see Figs. 1 and 14), by the fitting of a collar 48*a* on the rear end of member 48 in an annular enlargement of the recess last mentioned (see Figs. 1 and 3), and by a steadying set-screw, marked 50 in Fig. 3, for the member 47.

The operating means for the slides 36 and 37 include a common actuator, in the form of a fairly massive rod or slide-piece 51. The actuator reciprocates in a box-housing 52 secured to a side of the machine. In this connection see particularly Figs. 1, 3, 16 and 17.

Means are provided whereby this actuator 51 operates the slides 36 and 37 simultaneously, to reciprocate the cutter-block 29 on the slide 36 and the carrier 30 on the slide 37 as above described, so that the working and return strokes of the cutter-block and carrier, those of the former very short and those of the latter comparatively long, are correctly performed at the different speeds required.

The slide 36 is operated by a toggle link 53, having a relatively short throw, and connected at its ball-ends to the actuator 51 and to the inner ends of the slide 36, whereby during each travel of the actuator 51 toward the top of Figs. 1, 16 or 17, the cutter-block 29 on the slide 36 is given its working stroke, and during each travel of actuator 51 in the opposite direction said cutter-block is given a return stroke. A renewable wear plate 54 for the slide 36 is held in place by a screw 55.

The slide 37 is operated by the longer arm of a bell crank 56, the shorter arm of which bell crank is impositively connected to the actuator 51; said shorter arm being extended beyond an end of the actuator and being held thereagainst by a plunger head 57 carried by a rod 58 sleeved by a compression spring 59 applying its thrust behind said plunger head. The outer end of the longer arm of said bell crank is in operative engagement with the slide 37 by being extended into a recess 37' therein.

When the actuator 51 is moved from the position shown in Figs. 1 and 16 to the position shown in Figs. 2 and 17, the toggle link 53 is moved to the indicated extent toward a closer approach to parallelism with the direction of reciprocation of the slide 36, and the cutter-block 29 is thereby caused to perform its short, powerful stroke for the cutting off of a slug. During this movement of the actuator 55, the spring 59, acting through the plunger head 57, forces the shorter arm of the bell crank 56 to follow the actuator, and due to the fact that the actuator has a greater extent of movement than the slide 36 because of the toggle connection between the two, and to the fact that the arm of the bell crank connected to the slide 37 is the longer arm thereof, the carrier 30 on the slide 37 is caused by the spring 59, simultaneously with the short working stroke of the cutter-block, to perform its longer and faster working stroke.

On the return travel of the actuator 51, back to the position shown in Figs. 1 and 16, both the slides 36 and 37 are positively retracted, the former by the toggle link 53 and the latter by the direct thrust of the actuator 51 on the shorter arm of the bell crank 56; a spring 60, compressed by the preceding travel of the actuator in the opposite direction, now being allowed to expand.

The extent of reciprocation of the actuator 51 is somewhat less than that indicated by the longer transverse dimension of a slot 51*a* through the latter, as will be seen best from a comparison of Figs. 16 and 17. When the actuator is at one limit of its travel, a stud or pin 61, adjustably threadedly clamped in the outer side wall of the box-housing 52 as shown at 62 in Fig. 1, and extended through said slot, is near one end of the slot, and when the actuator is at the other end of its limit of travel, said pin is near the other end of the slot. The stud 61 is provided for presenting at its inner end a stop 61*a* for the slide 36, to insure that this slide will always at the end of a return stroke have the bore of the cut-off quill 31 of the cutter-block 30, such bore marked 31*a* in Fig. 1, in true and precise alignment with the bore of the fixed or stock-supply quill 25.

In order to insure that, when the slide 37 is at the end of a working stroke, the carrier 30 will always be so positioned that the slug-receiving opening of its gripper, such opening marked 30' in Fig. 5, is in true and precise alignment with the forming die 27, a stud or pin 63 is adjustably threadedly clamped in the side framing 20*a* of the machine as shown at 64. This stud at its inner end 63*a* presents a stop against which the longer arm of the bell crank 56 abuts when the slide 37 is at the end of its return stroke.

The actuator 51 is shown as positively operated in both directions by cam means on a single cam shaft 65; the necessity for an auxiliary cam shaft or equivalent being avoided because the simultaneous yet differential operations of the slides 36 and 37 are caused by a single or common actuator, in the present case the actuator 51.

This cam means is desirably in the form of two identical cams 66 and 67, with their similar single cam lobes 66*a* and 67*a* aligned as shown in Fig. 16 or 17; so that each travel of the actuator in one direction will be positively effected, by coaction between the cam lobe 66*a* and a follower 68 for the cam 66, and so that each travel of the actuator 51 in the opposite direction will be likewise positively effected, by coaction between the cam lobe 67*a* and a follower 69 for the cam 67. These followers 68 and 69 are here rollers on a rocker mount 70, having a hub portion 70*a* and oscillable about a shaft 71 extending through said hub portion. This rocker mount includes two arms 73 and 74, at the outer end of each of which is journaled one of the two rollers. These arms are offset not only angularly of the rocking axis of the mount 70, but also along such axis, so that the rollers 68 and 69 are respectively in the planes of the cams 66 and 67. The roller 69 is journaled at the outer end of the arm 74, at one side of the arm, on a pivot stud 75. The roller 68 is carried at the outer end of the arm 73, being journaled in one end of a bifurcation 76 integrally carried by said arm, on a pivot stud 77. The bifurcation 76, at its other end, affords, by way of a pivot stud 78, a pivotal connection for a link element 79*a* extended into the bifurcation. The link element 79*a* is integral with an end-piece 79 for a connection rod assemblage which includes a similar end-piece 80 and an interposed connector-stud 81 having oppositely threaded terminal lengths engaged with similarly tapped holes through end-pieces 79 and 80, whereby the effective length of the connecting rod assemblage can be readily adjusted. For the purpose last-mentioned, this connector stud is shown as carrying intermediate its ends a nut formation 81*a*. The main body of each of the two end-pieces 79 and 80 is shown as split at one side of its hole engaging a threaded end of the stud 81 and as equipped with a set screw 82 or 83 for drawing the split portions together to lock the connector rod assemblage to its adjusted length. The end-piece 80 has a link extension 80*a*, which is received in a bifurcation 51*b* at the cam-adjacent end of the actuator 51, and mounted on the stud 84, for permitting the connector rod assemblage to rock relative to the actuator in agreement with the swings of rollers 68 and 69 about the axis of shaft 71 as the rocker mount 70 oscillates from the position shown in Fig. 16 to that shown in Fig. 17, and vice versa.

During each travel of the actuator 51 in a downward direction in Fig. 1, the actuator, by forcing down the shorter arm of the bell crank 56, performs the work of compressing the spring 59. On the other hand, during each travel of the actuator in the opposite direction, the actuator performs the work of compressing the spring 60. These springs can be so designed that on each travel of the actuator in either direction, the work of compressing one spring is relieved and materially compensated for by the simultaneous expansion of the other spring from the compression to which it was forced by the preceding travel of the actuator in the other direction. Primarily, however, the employment of the springs 58 and 60, in the relations shown, permits positive or cam operation of the single actuator 51 during each of its two directions of travel, and yet allows the employment of adjustable stops, as those at 61*a* and 63*a* as above described, one for always insuring proper ending of the return stroke of the cutter-block 29, and the other for always insuring proper ending of the working stroke of carrier 30; it being noted in this connection that the adjustability of the connector stud 81, for varying the effective length of the connecting rod assemblage, permits the take-up of any lost motion, particularly at the sockets in the slide 36 and in the actuator 51 which receive the ball-ends of the toggle-link 53, and anywhere between said slide and the cams 66 and 67, as may be required to be taken up to have the stops 61*a* and 63*a* function as intended. There will be no or negligible lost motion between the slide 37 and the actuator 51, as there is but one pivot stud intervening, that on which the bell crank 56 is mounted. The bell crank can be nicely fitted on its pivot, while the oppositely facing roundings on the outer end of the longer arm of the bell crank can be nicely fitted against the walls of the recess 37′ which engage these roundings. Thus, also, at the end of each return stroke of the slide 37, the gripper of carrier 30 will always properly align itself with the cut-off quill 31 of the cutter-block 29 then aligned, by the slide 36 reaching the end of its return stroke, with the fixed or stock-supply quill 25.

While the parts are arranged as shown in Fig. 16, and until the cam lobe 67*a* passes beyond the roller 69, the actuator 51 is held as shown in this view, and the cutter-block 29 and carrier 30 are simultaneously halted at the ends of their return strokes, as shown in Figs. 1 and 3; such pause of the parts being long enough to permit the stock 26 to be advanced into the cut-off quill 31 of the cutter-block to the extent of a slug length. When the cams have further rotated sufficiently to locate the roller 69 at the beginning of the descending slope at the follower end of the cam lobe 67*a*, the roller 68 is located at the beginning of the ascending slope at the leading end of the cam lobe 66*a*. As both the slopes last mentioned are simultaneously further progressed, relative to the rollers 69 and 68, respectively, the rocker mount 70 is moved from the position shown in Fig. 16 to that shown in Fig. 17, positively, by the action of the cam 66 on the roller 68; thereby causing the slides 36 and 37 to perform their working strokes. During further rotation of the cams, all the while the roller 68 is on the main surface of cam lobe 67*a*, the cutter-block 29 and the carrier 30 are halted at the positions shown in Figs. 2 and 4.

While the carrier 30 is thus halted, the heading tool 23 is advanced to engage the slug and push the same through the carrier to cause the inner end of the slug to enter the die cavity of the forming die 27; this first or partial advance of the heading tool being the result of a partial advance of the gate 24, brought about in the known or any suitable way. At the instant the slug is thus engaged, the cams have so advanced that the carrier 30 starts a return stroke, leaving the slug in working position. As soon as the carrier 30, during this return stroke, has been sufficiently cleared away from the slug to allow of the heading operation, that operation is performed by the heading tool 23, incidental to a further and complete advance of the gate 24. Since this period in the cycle is usually very fast, it is advisable, where short slugs are being headed, to bevel off the slug-carrying end of the carrier 30, such bevel being extended to cause the outer face of the carrier to taper toward the outer end of the latter, and correspondingly to bevel off the side of the heading tool 23 adjacent to the path of travel of the carrier, so that these parts will clear each other.

When the cams have rotated sufficiently to locate the roller 69 again on the main arcuate surface of the cam lobe 67*a*, the rocker mount 70 has been moved from the position shown in Fig. 17 back to that shown in Fig. 16, thus to restore the carrier 30 and the cutter 33 to the positions shown in Figs. 1 and 3.

While rod or wire stock of circular cross-section has been shown in the drawings and referred to in the specification, it will be understood that such stock need not necessarily be rod stock, as the same can be of any cross-section desired.

Variations and modifications may be made within the scope of this invention and portions of the improvements may be used without others.

I claim:

1. A mechanism for cutting off slugs from metal stock and having means for girthwisely confining the stock and through which means the stock is adapted to be periodically fed to advance an end-length of the stock beyond the same, the combination of a cutter reciprocable transverse to said advanced end-length to sever the same to produce a slug; receptor means carried by the cutter transversely thereof for girthwisely confining said end-length substantially from end to end thereof during its severance; and reciprocating means for the cutter, said means functioning to halt the cutter, before each severance stroke thereof, to dispose said receptor means in position to receive said end-length when the stock is fed.

2. A mechanism as defined in claim 1, wherein said receptor means includes a bore through the cutter of constant cross-section throughout and of substantially the same cross-section as the stock.

3. A mechanism as defined in claim 1, wherein the first-mentioned confining means is a stationary quill and said receptor means is a cut-off quill of substantially the same internal diameter as the stationary quill.

4. A mechanism as defined in claim 1, wherein said receptor means includes a bore through the cutter of a length which is a multiple of the length of the slug to be severed from the stock.

5. In a heading machine, in combination with a bed having a cutting-off station and a heading station, a cutter reciprocable perpendicular to the direction of stock advance to the cutting-off station, said cutter having a transverse aperture therethrough at least as long as the slug to be cut off; means for reciprocating said cutter to an extent less than the distance between the cutting-off station and the heading station and for halting the cutter at the end of each return stroke thereof to align said aperture with the cutting-off station so that stock then advanced at said station can enter said aperture to the extent of a slug-length; means serving the cutting station for guiding the stock during said advance; a carrier reciprocable parallel with the cutter adjacent to the side thereof remote from the cutting-off station, said carrier having a gripper for a slug discharged from the aperture of the cutter; and means for reciprocating said carrier to a greater extent than the cutter to bring the slug to the heading station and for halting the carrier at the end of a working stroke with the gripper aligned with the cutting-off station while the cutter is halted at the end of a return stroke of the latter with its aperture aligned with the cutting-off station, whereby then a further advance of the stock into the aperture of the cutter transfers from said aperture to the gripper a slug in said aperture.

6. A heading machine as defined in claim 5, wherein the operating means for the cutter and the carrier are so timed that for each working stroke performed by the cutter the carrier performs a working stroke.

7. A heading machine as defined in claim 5, wherein the aperture in the cutter has a length which is a multiple of a length of the slug.

8. In a mechanism for cutting off slugs, a reciprocable cutter block; a cut-off quill therein; and means for reciprocating the cutter-block, said quill having a bore of a length such that a stock end-length entered into said cut-off quill is contained in said bore substantially from end to end of said end-length during cutting off of same by the cutter to form a slug, said bore being closed all around the same to completely girthwisely confine said end-length.

9. In a heading machine, a reciprocable cutter-block having a bore of a length such that a stock end-length entered therein is confined thereby substantially from end to end of said end-length during cutting off of same by the cutter to form a slug; a reciprocable carrier for said slug adapted to receive a slug transferred from the cutter-block; and means for giving simultaneous working strokes to both the cutter-block and the carrier at different speeds.

10. In a heading machine, mechanism for cutting off slugs from metal stock comprising a reciprocable cutter-block; and a magazine carried thereby for holding a plurality of slugs cut from the metal stock, said magazine shaped interiorly to confine a length of the stock to be cut off into a slug and for confining said stock length from end to end thereof during such cut off, said magazine in said shaped part providing a shear means for producing a slug with square ends.

11. In a heading machine, mechanism for cutting off slugs from metal stock comprising a reciprocable device movable transverse to the stock to produce a slug; a reciprocable device movable transverse to the stock for transporting a slug received from the first-mentioned device and having a longer working stroke than the latter for conveying said slug beyond the end of the working stroke of said first-mentioned device, and operating means for said devices to cause them to have simultaneously performed working strokes at different speeds, said operating means includes a common actuator for both devices.

12. A mechanism as in claim 1, in which said receptor means comprises a cylindrical chamber open at both its opposite ends at opposite sides of the cutter and of a length which is a multiple of the length of the slug to be severed from the stock.

13. A mechanism as in claim 8, in which the length of the said quill is a multiple of the length of said slug.

14. A mechanism as in claim 1, in which said receptor means comprises a passage-way extending through the cutter-block and open at its opposite ends at opposite sides of the cutter-block and of a length which is substantially a multiple of the length of the slug to be severed from the stock.

15. A mechanism as defined in claim 1, in which the first-mentioned confining means is a stationary quill and said receptor means is a cut-off quill of substantially the same internal diameter as the stationary quill, there being means for demountably securing the cut-off quill to the cutter.

16. A heading machine as defined in claim 5, in which the operating means for the cutter and the carrier are so timed that for each working stroke performed by the cutter the carrier performs a working stroke, and for each return stroke performed by the cutter the carrier performs a return stroke.

17. A heading machine as in claim 5, in which the carrier is of lighter weight than the cutter and the extent of reciprocation of the cutter is a very small fraction of the extent of reciprocation of the carrier.

18. In a heading machine, a reciprocable cutter-block having a stock-receiving opening therethrough of such length and cross-sectional shape that a stock end-length entered therein is confined therein against tilting in the direction of the working stroke of the cutter-block during such stroke; a reciprocable carrier adapted to receive a slug transferred from the cutter-block; and means for reciprocating the cutter-block and the carrier at different speeds.

19. In a heading machine, a reciprocable cutter-block having a stock-receiving opening therethrough of such length and cross-sectional shape that a stock end-length entered therein is confined therein against tilting in the direction of the working stroke of the cutter-block during such stroke; a reciprocable carrier adapted to receive a slug transferred from the cutter-block; a forming die; a stock supply quill; and a bed structure having fixed thereon said quill and said die, said bed structure being set back at a point between said quill and said die to present a recess providing a field of reciprocation for the part of the cutter-block carrying said opening, the outer end of said die being located beyond the front of said recess.

20. A heading machine as in claim 19, in which the outer face of the cutter-block is in direct sliding engagement with the inner face of the carrier.

21. A heading machine as in claim 19, in which the outer face of the cutter-block is substantially in the same plane as the outer face of the die.

22. A heading machine as in claim 19, in which the depth of said recess is substantially equal to the distance, measured in a direction extending axially of the die, between the outer ends of the die and quill.

23. A heading machine as in claim 11, in which said operating means includes an operative connection to said slug-producing device incorporating a power-increasing instrumentality and an operative connection to said slug-transporting device incorporating a power-diminishing instrumentality.

24. A heading machine as in claim 11, in which said operating means includes an operative connection to said slug-producing device incorporating a toggle-link and an operative connection to said slug-transporting device incorporating a lever.

25. A heading machine as in claim 11, in which said operating means includes an operative connection to said slug-producing device incorporating a toggle-link and an operative connection to said slug-transporting device incorporating a bell crank.

26. A heading machine as in claim 11, in which said actuator is reciprocable, and in which said operating means includes an operative connection to said slug-producing device and between which and the actuator there is a permanent inter-engagement and also includes an operative connection to said slug-transporting device upon which said actuator acts thrustingly in only one direction of movement thereof.

27. A heading machine as in claim 11, in which said actuator is reciprocable, and in which two separate cams are provided each for giving said actuator movement by positive thrust in a different one of its two movements in opposite directions.

28. A heading machine as in claim 11, in which said actuator is reciprocable, and in which two separate cams are provided each for giving said actuator movement by positive thrust in a different one of its two movements in opposite directions, and in which two oppositely thrusting yielding means are provided each for opposing cam thrust against the actuator in a different one of its said two movements.

29. A heading machine as in claim 11, in which said actuator is reciprocable, and in which said operating means includes an operative connection to said slug-producing device and between which and the actuator there is a permanent inter-engagement and also includes an operative connection to said slug-transporting device upon which said actuator acts thrustingly in only one direction of movement thereof, and in which two oppositely thrusting springs are provided one acting directly against the actuator and one acting indirectly against the actuator through pressure on the operative connection second-mentioned.

30. A heading machine as in claim 11, in which said actuator is reciprocable, and in which said operating means includes an operative connection to said slug-producing device and between which and the actuator there is a permanent inter-engagement and also includes an operative connection to said slug-transporting device upon which said actuator acts thrustingly in only one direction of movement thereof, said actuator acting as last described only while moving in a direction to operate the slug-producing device to perform a return stroke, there being a spring means for causing the slug-transporting device to perform a working stroke while said actuator is moving to cause said slug-producing device to perform a working stroke.

31. A heading machine as in claim 11, in which said actuator is reciprocable, and in which said operating means includes an operative connection to said slug-producing device and between which and the actuator there is a permanent inter-engagement and also includes an operative connection to said slug-transporting device upon which said actuator acts thrustingly in only one direction of movement thereof, said actuator acting as last described only while moving in a direction to operate the slug-producing device to perform a return stroke, there being a spring means for causing the slug transporting device to perform a working stroke while said actuator is moving to cause said slug-producing device to perform a working stroke, and a cam for positively thrusting said actuator to the stroke last-mentioned.

32. A heading machine as in claim 11, in which said actuator is reciprocable, and in which said operating means includes an operative connection to said slug-producing device and between which and the actuator there is a permanent inter-engagement and also includes an operative connection to said slug-transporting device upon which said actuator acts thrustingly in only one direction of movement thereof, said actuator acting as last described only while moving in a direction to operate the slug-producing device to perform a return stroke, there being a spring means for causing the slug-transporting device to perform a working stroke while said actuator is moving to cause said slug-producing device to perform a working stroke, a cam for positively thrusting said actuator to the stroke last-mentioned, and another cam for positively thrusting said actuator to perform a stroke in the opposite direction.

33. In combination in a metal swaging machine, shaping dies, a fixed shearing die having a bore of susbtantially the same diameter and cross-sectional shape as the metal to be swaged, a shearing die movable across the face of the fixed shearing die, said movable die having a bore of susbtantially the same diameter and cross-sectional shape as the bore of the fixed shearing die with the wall of said bore at the cutting edge of the shearing die completely surrounding the metal to be swaged, a reciprocatory carrier having means for receiving blanks from the movable shearing die means whereby cut blanks are transferred from the shearing die to the carrier, mechanism for reciprocating the movable shearing die, and mechanism for reciprocating said carrier in the same direction as but at greater speed than the movements of the shearing die.

34. In combination in a metal swaging machine, shaping dies, a fixed shearing die having a bore of substantially the same diameter and cross-sectional shape as the metal to be swaged, a shearing die movable across the face of the fixed shearing die, said movable die having a bore of susbtantially the same diameter and cross-sectional shape as the bore of the fixed shearing die with the wall of said bore at the cutting edge of the shearing die completely surrounding the metal to be swaged, a reciprocatory carrier having means for receiving blanks from the movable shearing die means whereby cut blanks are transferred from the shearing die to the carrier, mechanism for reciprocating the movable shearing die and mechanism for reciprocating said carrier in the same direction but further and faster than said shearing die.

35. In combination in a metal swaging machine, shaping dies, a fixed shearing die having a bore of substantially the same diameter and cross-sectional shape as the metal to be swaged, a shearing die movable across the face of the fixed shearing die, said movable die having a bore of substantially the same diameter and cross-sectional shape as the bore of the fixed shearing die with the wall of said bore at the cutting edge of the shearing die completely surrounding the metal to be swaged, a reciprocatory carrier having means for receiving blanks from the movable shearing die means whereby cut blanks are transferred from the shearing die to the carrier, mechanism imparting a short quick reciprocation to the movable shearing die, and mechanism for imparting in the same direction as the movements of the shearing die a long rapid reciprocation to said carrier.

36. In combination in a metal swaging machine, shaping dies, a fixed shearing die having a bore of substantially the same diameter and cross-sectional shape as the metal to be swaged, a shearing die movable across the face of the fixed shearing die, said movable die having a bore of substantially the same diameter and cross-sectional shape as the bore of the fixed shearing die with the wall of said bore at the cutting edge of the shearing die completely surrounding the metal to be swaged, a reciprocatory carrier having means for receiving blanks from the movable shearing die means whereby cut blanks are transferred from the shearing die to the carrier, mechanism for reciprocating the movable shearing die, and mechanism dependent upon and controlled by the movements of the shearing die for reciprocating said carrier.

37. In combination in a metal swaging machine, shaping dies, a fixed shearing die having a bore of substantially the same diameter and cross-sectional shape as the metal to be swaged, a shearing die movable across the face of the fixed shearing die, said movable die having a bore of substantially the same diameter and cross-sectional shape as the bore of the fixed shearing die with the wall of said bore at the cutting edge of the shearing die completely surrounding the metal to be swaged, a carrier having means for receiving blanks from the movable shearing die means whereby cut blanks are transferred from the shearing die to the carrier, toggle means for reciprocating the movable shearing die, and bell crank and spring means for reciprocating said carrier.

38. In combination in a metal swaging machine, shaping dies, a fixed shearing die having a bore of substantially the same diameter and cross-sectional shape as the metal to be swaged, a shearing die movable across the face of the fixed shearing die, said movable die having a bore which closely confines the metal to be sheared thereby, a reciprocatory carrier having means for receiving blanks from the movable shearing die means whereby cut blanks are transferred from the shearing die to the carrier, mechanism for reciprocating the movable shearing die and mechanism dependent upon the movements of the shearing die for reciprocating said carrier.

39. In combination in a metal swaging machine, shaping dies, a fixed shearing die having a bore of substantially the same diameter and cross-sectional shape as the metal to be swaged, a slide movable transversely of the bore of the fixed shearing die, a shearing die attached to said slide and movable across the face of the fixed shearing die, said movable die having a bore of substantially the same diameter and cross-sectional shape as the bore of the fixed shearing die, a slide movable transversely of the bore of said movable die, a carrier attached to said latter slide and having means for receiving blanks from the movable shearing die, toggle mechanism for reciprocating said die slide, and a bell crank engaged with said toggle mechanism and with the carrier slide for reciprocating said carrier.

40. In combination in a metal swaging machine, shaping dies, a fixed shearing die having a substantially cylindrical bore, a slide movable transversely of the bore of the fixed shearing die, a shearing die having a substantially cylindrical bore attached to said slide and movable across the face of the fixed shearing die, a slide movable transversely of the bore of said movable die, a carrier attached to said latter slide and having means for receiving blanks from the movable shearing die, toggle mechanism for reciprocating said die slide, and a bell crank engaged with said toggle mechanism and with the carrier slide for reciprocating said carrier.

41. In combination in a metal swaging machine, shaping dies, a fixed shearing die having a substantially cylindrical bore, a slide movable transversely of the bore of the fixed shearing die, a shearing die having a substantially cylindrical bore, attached to said slide and movable across the face of the fixed shearing die, a slide movable transversely of the bore of said movable die, a carrier attached to said latter slide and having means for receiving blanks from the movable shearing die, toggle mechanism for reciprocating said die slide, adjustable means for limiting the outward movement of said die slide, a bell crank engaged with said toggle mechanism and with the carrier slide for reciprocating said carrier, and adjustable means for limiting the inward movement of said carrier slide.

ALBERT H. GAESS.